US011916618B2

United States Patent
Li et al.

(10) Patent No.: US 11,916,618 B2
(45) Date of Patent: Feb. 27, 2024

(54) NEAR FIELD COMMUNICATION TAG AND CONTROL SYSTEM FOR NEAR FIELD COMMUNICATION TAG

(71) Applicant: BOE Technology Group Co., Ltd., Beijing (CN)

(72) Inventors: Xin Li, Beijing (CN); Jinlei Li, Beijing (CN); Xinxin Yang, Beijing (CN); Kejun Hu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 320 days.

(21) Appl. No.: 17/431,365

(22) PCT Filed: Jan. 26, 2021

(86) PCT No.: PCT/CN2021/073737
§ 371 (c)(1),
(2) Date: Aug. 16, 2021

(87) PCT Pub. No.: WO2021/159952
PCT Pub. Date: Aug. 19, 2021

(65) Prior Publication Data
US 2023/0138140 A1    May 4, 2023

(30) Foreign Application Priority Data
Feb. 13, 2020 (CN) .......................... 202010090435.5

(51) Int. Cl.
*H04B 5/00* (2006.01)
*H04W 4/80* (2018.01)

(52) U.S. Cl.
CPC ......... *H04B 5/0056* (2013.01); *H04B 5/0037* (2013.01)

(58) Field of Classification Search
CPC ...... H04B 5/00; H04B 5/0025; H04B 5/0056; H04B 5/0037; H04B 5/0062; H04W 4/80
See application file for complete search history.

(56) References Cited

U.S. PATENT DOCUMENTS 6,275,681 B1    8/2001    Vega et al.
11,134,141 B1 *    9/2021    Bushnell ................. H01Q 1/42
(Continued)

FOREIGN PATENT DOCUMENTS

CN    101752899 A    6/2010
CN    102035265 A    4/2011
(Continued)

OTHER PUBLICATIONS

CN 2020100904355 first office action.
PCT/CN2021/073737 international search report and written opinion.

*Primary Examiner* — Blane J Jackson
(74) *Attorney, Agent, or Firm* — IPro, PLLC

(57) ABSTRACT

A Near Field Communication (NFC) tag and a control system for the NFC tag are provided. The NFC tag includes: a NFC coil, a control circuit, an energy acquisition circuit, and an energy storage circuit, wherein the NFC coil is configured to detect a magnetic field signal transmitted by a card reader when a distance between the NFC tag and the card reader is within a predetermined distance range; the energy acquisition circuit is configured to convert the magnetic field signal into an electrical signal when the NFC coil detects the magnetic field signal; and the control circuit is configured to control the energy acquisition circuit to transmit the electrical signal to the energy storage circuit, and control to charge the energy storage circuit through the electrical signal.

18 Claims, 3 Drawing Sheets

(56) References Cited

U.S. PATENT DOCUMENTS

| | | | | |
|---|---|---|---|---|
| 11,442,134 | B1* | 9/2022 | Beigel | .................. A01K 11/006 |
| 2016/0188919 | A1 | 6/2016 | Gao et al. | |
| 2016/0268849 | A1 | 9/2016 | Kwon et al. | |
| 2019/0026618 | A1 | 1/2019 | Jesme et al. | |
| 2021/0090055 | A1* | 3/2021 | Lee | ........................ G06Q 20/40 |

FOREIGN PATENT DOCUMENTS

| | | | | |
|---|---|---|---|---|
| CN | 202443486 | U | * | 9/2012 |
| CN | 202443486 | U | | 9/2012 |
| CN | 102801218 | A | | 11/2012 |
| CN | 103500352 | A | | 1/2014 |
| CN | 205451437 | U | | 8/2016 |
| CN | 107004153 | A | | 8/2017 |
| CN | 107257979 | A | | 10/2017 |
| CN | 109149718 | A | | 1/2019 |
| CN | 109921832 | A | | 6/2019 |
| CN | 110518705 | A | | 11/2019 |
| CN | 110533141 | A | | 12/2019 |
| CN | 111313938 | A | | 6/2020 |

* cited by examiner

NEAR FIELD COMMUNICATION TAG AND CONTROL SYSTEM FOR NEAR FIELD COMMUNICATION TAG

CROSS-REFERENCE TO RELATED APPLICATIONS

The present application is the U.S. national phase of PCT Application No. PCT/CN2021/073737 filed on Jan. 26, 2021, which claims priority to Chinese Patent Application No. 202010090435.5 filed in China on Feb. 13, 2020, which are incorporated herein by reference in their entireties.

TECHNICAL FIELD

The present disclosure relates to the technical field of electronic tags, and in particular to a Near Field Communication (NFC) tag and a control system for the NFC tag.

BACKGROUND

Currently, NFC tags are generally battery-powered, which is characterized by operation with power consumption. Even in the case of low frequency operation, the battery may only maintain a low power consumption operation time of about five years. In most cases, the tag is discarded after the battery is exhausted, resulting in serious waste of resources and damage to the environment. For this reason, in the related art, a rechargeable lithium battery is used to extend the operation time of the tag as far as possible, and the operating cost is reduced by reducing the frequency for replacing the battery. However, with the progress of science and technology, the prominent energy problem, the lack of resources, etc., the energy consumption of the NFC tag of the related art is still relatively high, which does not meet the energy-saving and environmental-friendly requirements for NFC tags, and the user experience is poor.

SUMMARY

In a first aspect, embodiments of the present disclosure provide a NFC tag, including: a NFC coil, a control circuit, an energy acquisition circuit, and an energy storage circuit, wherein
  the NFC coil is configured to detect a magnetic field signal transmitted by a card reader when a distance between the NFC tag and the card reader is within a predetermined distance range;
  the energy acquisition circuit is configured to convert the magnetic field signal into an electrical signal when the NFC coil detects the magnetic field signal; and
  the control circuit is configured to control the energy acquisition circuit to transmit the electrical signal to the energy storage circuit, and control to charge the energy storage circuit through the electrical signal.
  Optionally, the energy acquisition circuit is connected to the NFC coil and the control circuit, respectively, and the energy storage circuit is connected to the energy acquisition circuit and the control circuit, respectively.
  Optionally, the energy acquisition circuit includes:
  an energy conversion sub-circuit, wherein the energy conversion sub-circuit is connected to the NFC coil and the control circuit, respectively, the energy conversion sub-circuit is configured to convert the magnetic field signal into the electrical signal when the NFC coil detects the magnetic field signal, and the control circuit is configured to control the energy conversion sub-circuit to transmit the electrical signal to the energy storage circuit; and
  a first switching sub-circuit, wherein the first switching sub-circuit is connected to the energy conversion sub-circuit and the energy storage circuit, respectively, and the first switching sub-circuit is configured to electrically connect the energy conversion sub-circuit to the energy storage circuit, or electrically disconnect the energy conversion sub-circuit from the energy storage circuit.
  Optionally, the NFC tag further includes: an electronic ink display screen, wherein the electronic ink display screen is connected to the control circuit, the control circuit is configured to control the NFC tag to perform data transmission with the card reader upon detecting that a voltage of the energy storage circuit reaches a rated voltage, and refresh display content of the electronic ink display screen after the data transmission has been performed.
  Optionally, the control circuit is connected to the first switching sub-circuit, and the control circuit is further configured to:
    control the first switching sub-circuit to electrically disconnect the energy conversion sub-circuit from the energy storage circuit after the display content of the electronic ink display screen has been refreshed.
  Optionally, the NFC tag further includes:
  a second switching circuit, wherein the second switching circuit is connected to the energy storage circuit and the electronic ink display screen, respectively, and the second switching circuit is configured to electrically connect the energy storage circuit to the electronic ink display screen or electrically disconnect the energy storage circuit from the electronic ink display screen.
  Optionally, the control circuit is connected to the second switching circuit, and the control circuit is further configured to:
    control the second switching circuit to electrically connect the electronic ink display screen to the energy storage circuit after the data transmission has been performed.
  Optionally, the NFC tag further includes:
  a state storage circuit;
  the control circuit is further configured to: identify the card reader through the energy conversion sub-circuit when the distance between the NFC tag and the card reader is within the predetermined distance range, determine whether the NFC tag is matched with the card reader, update a flag bit state in the state storage circuit to be a state of waiting for being charged when the NFC tag is matched with the card reader; update the flag bit state in the state storage circuit to be a charging completion state upon detecting that the voltage of the energy storage circuit reaches the rated voltage; and update the flag bit state in the state storage circuit to be a refreshing success state after the display content of the electronic ink display has been refreshed.
  Optionally, the energy storage circuit is a supercapacitor.
  Optionally, the first switching sub-circuit and/or the second switching circuit is a metal oxide semiconductor field effect transistor.
  Optionally, the state storage circuit is an electrically erasable programmable read only memory.
  In a second aspect, the embodiments of the present disclosure provide a control system of a NFC tag, including: a card reader and the NFC tag provided in the embodiments of the first aspect of the present disclosure.

Optionally, the card reader is a mobile terminal having a NFC function.

DETAILED DESCRIPTION

Figure 1:
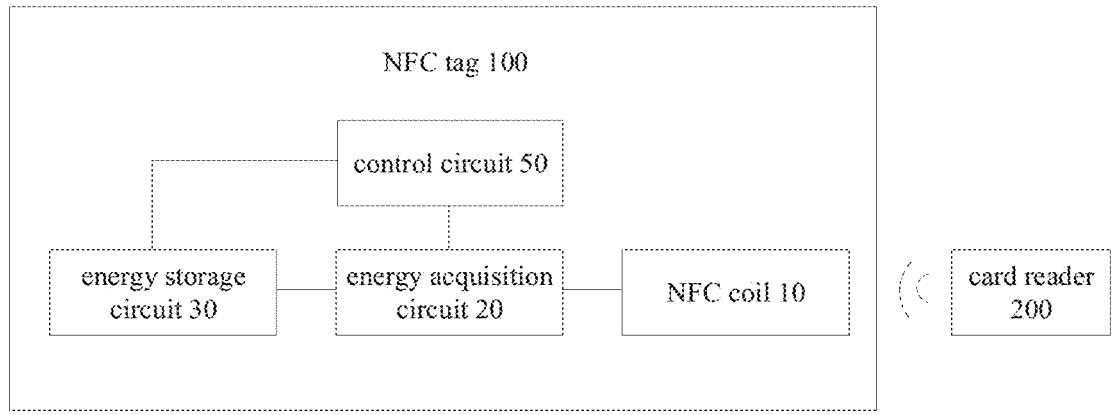
FIG. 1 is a structural block diagram of a NFC tag according to an embodiment of the present disclosure.

Embodiments of the present disclosure will be described in detail below, examples of the embodiments are illustrated in the accompanying drawings, wherein the same or similar reference numerals refer to the same or similar parts or parts having the same or similar functions. The embodiments described below with reference to the accompanying drawings are exemplary and are intended to explain the present disclosure and are not to be construed as limiting the present disclosure.

Hereinafter, a NFC tag and a control system for the NFC tag according to the embodiments of the present disclosure will be described with reference to the accompanying drawings.

FIG. 1 is a structural block diagram of a NFC tag according to an embodiment of the present disclosure.

As shown in FIG. 1, the NFC tag 100 includes: a NFC coil 10, an energy acquisition circuit 20, an energy storage circuit 30, and a control circuit 50.

The NFC coil 10 is configured to detect a magnetic field signal when a card reader 200 is within a set range; the energy acquisition circuit 20 is connected to the NFC coil 10 and the control circuit 50, respectively, the energy acquisition circuit 20 is configured to convert the magnetic field signal detected by the NFC coil 10 into an electrical signal when the NFC coil 10 detects the magnetic field signal; the energy storage circuit 30 is connected to the energy acquisition circuit 20 and the control circuit 50, respectively, and the control circuit 50 is configured to control the charging of the energy storage circuit 30 with the electrical signal.

Specifically, in practical applications, when the card reader 200 is located within the set range near the NFC coil 10, the card reader 200 initiates magnetic induction, so that the NFC coil 10 may detect the magnetic field signal and transmit the magnetic field signal to the energy acquisition circuit 20, the energy acquisition circuit 20 converts the magnetic field signal into an electrical signal and transmits the electrical signal to the energy storage circuit 30 under the control of the control circuit 50; and the control circuit 50 controls the energy storage circuit 30 to store electric energy in a wireless charging manner under the effect of the electric signal.

It should be noted that, in the embodiment of the present disclosure, the energy acquisition circuit 20 has a NFC function. The card reader 200 may be, for example, a mobile terminal (e.g. a mobile phone or a Personal Digital Assistant (PDA)) having a NFC function; in other words, the card reader 200 may include a NFC chip, and when the card reader 200 is located within the set range near the NFC coil 10, the card reader 200 may read relevant information from the NFC tag 100 if required, so as to perform data transmission, thereby realizing the data transmission from the NFC tag 100 to the card reader 200, and accordingly, the card reader 200 reads the data transmitted by the NFC tag 100. The above set range may be an effective distance for initiating magnetic induction between the card reader 200 and the NFC tag 100. The effective distance may be determined according to the actual situation, and may be, for example, a distance in the range of 1 cm to 10 cm.

In general, the NFC tag 100 does not require power supply of the battery, the energy storage circuit 30 stores electric energy in a wireless charging manner, and the NFC tag 100 is powered through the electric energy stored in the energy storage circuit 30 so as to enable the NFC tag 100 to operate properly. As compared with the method of using a battery to power the NFC tag 100 in the related art, resource waste may be reduced, environmental damage may be reduced, cost may be reduced, and energy may be saved and environmental protection may be improved.

Thus, the energy storage circuit is charged under the action of the magnetic field signal to realize wireless charging, which does not require the power supply of the battery, and is more energy-saving and environmental-friendly, and has the advantages of low cost and low power consumption.

It should be noted that in the related art, a user usually needs to manually turn on a charging circuit of the communication tag 100 before charging the NFC tag 100. However, when the user wants to continue to charge the communication tag 100 after the charging is interrupted (e.g. an electronic device for charging is electrically disconnected), the user has to manually turn on the charging circuit of the communication tag 100 again, resulting in high frequency of the user operation and reducing the user experience. In contrast, in the embodiments of the present disclosure, the energy storage circuit 30 acquires a current signal (microcurrent) so as to perform wireless charging, and it does not require the user to manually turn on the charging circuit. However, when the energy storage circuit 30 is a supercapacitor, if a charged device forms a return circuit, the supercapacitor will self-discharge, and if the charging circuit is not timely turned off, the supercapacitor will self-discharge to be at 0 V, resulting in a longer time for the next charging and reducing the user experience.

In order to solve this technical problem, in the embodiments of the present disclosure, it may automatically turn on and turn off the charging circuit (a first switching sub-circuit 22 is further provided in the energy acquisition circuit 20), to improve the user experience, which will be described in details below in conjunction with FIGS. 2 to 5.

Figure 2:
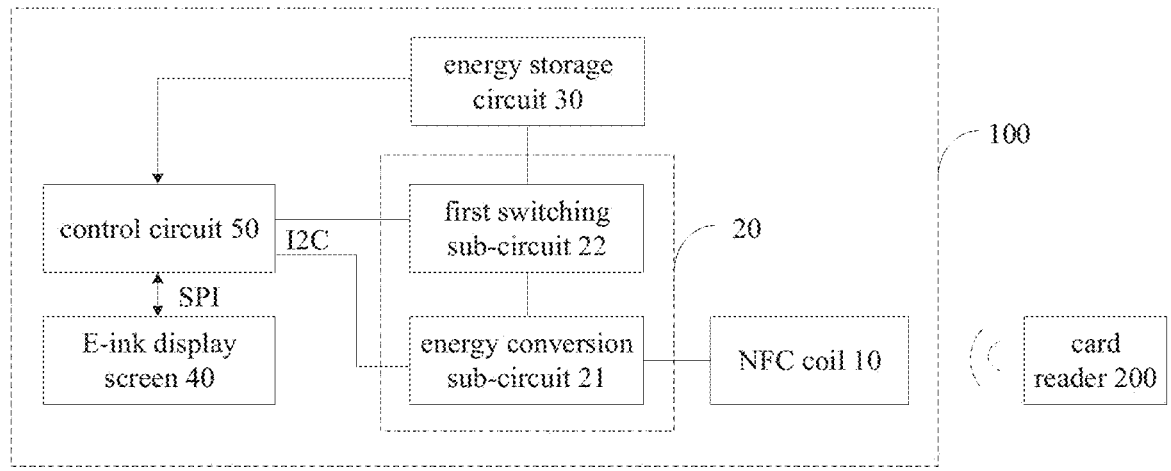
FIG. 2 is a structural block diagram of a NFC tag according to an embodiment of the present disclosure.

In an embodiment of the present disclosure, as shown in FIG. 2, the energy acquisition circuit 20 may include: an energy conversion sub-circuit 21 and a first switching sub-circuit 22.

The energy conversion sub-circuit 21 is connected to the NFC coil 10 and the control circuit 50, respectively, and the energy conversion sub-circuit 21 is configured to convert the magnetic field signal detected by the NFC coil 10 into an electrical signal when the NFC coil detects the magnetic field signal; the control circuit 50 is configured to control the energy conversion sub-circuit 21 to transmit the electrical signal to the energy storage circuit 30; the first switching sub-circuit 22 is connected to the energy conversion sub-circuit 21 and the energy storage circuit 30, respectively, and the first switching sub-circuit 22 is configured to electrically connect the energy conversion sub-circuit 21 to the energy storage circuit 30 or electrically disconnect the energy conversion sub-circuit 21 fro, the energy storage circuit 30.

In an example, referring to FIG. 2, the NFC tag 100 may further include an electronic ink display screen 40. The control circuit 50 is connected to the electronic ink display screen 40, the control circuit 50 is configured to control the NFC tag 100 to perform data transmission with the card reader 200 when detecting that the voltage of the energy storage circuit 30 reaches a rated voltage, and refresh the display content of the electronic ink display screen 40 after the data transmission is complete.

Further, referring to FIG. 2, the control circuit 50 is connected to the first switching sub-circuit 22, and the control circuit 50 is further configured to: control the first switching sub-circuit 22 to electrically disconnect the energy conversion sub-circuit 21 from the energy storage circuit 30 after refreshing the display content of the electronic ink display screen 40.

Specifically, in practical applications, when the card reader 200 is within the set range near the NFC coil 10, the NFC coil 10 detects a magnetic field signal and transmits the detected magnetic field signal to the energy conversion sub-circuit 21. The energy conversion sub-circuit 21 converts the received magnetic field signal into an electric signal, and when a voltage value of the electric signal is greater than a pre-set value (e.g. 1.8 V), the control circuit 50 starts to operate. At this moment, the control circuit 50 may control the first switching sub-circuit 22 to turn on, so that the first switching sub-circuit 22 electrically connects the energy conversion sub-circuit 21 to the energy storage circuit 30, and then the energy storage circuit 30 stores energy in a wireless charging manner under the action of the electric signal. In the energy storage process, the control circuit 50 may detect the voltage of the energy storage circuit 30 in real time, and control the NFC tag 100 to perform data transmission with the card reader 200 when the voltage reaches the rated voltage (e.g. 1.8 V), that is, at this moment, data transmission is performed while charging the energy storage circuit 30. After the control circuit 50 has detected that the data transmission is completed, the control circuit 50 may control the electronic ink display screen 40 to refresh the display content, that is, the electric power of the energy storage circuit 30 enables the electronic ink display screen 40 to refresh the display content so that the electronic ink display screen 40 displays the transmitted data. In the refreshing process, the control circuit 50 may detect whether the refreshing is completed in real time, and when the refreshing is completed, the control circuit 50 controls the first switching sub-circuit 22 to electrically disconnect the energy conversion sub-circuit 21 from the energy storage circuit 30 so as to timely switch off the charging circuit, thereby reducing the power consumption thereof, and ensuring that the power of the energy storage circuit 30 does not start from 0 V at the next charging.

In this example, referring to FIG. 2, communication between the control circuit 50 and the electronic ink display screen 40 may be implemented through a Serial Peripheral Interface (SPI). The energy conversion sub-circuit 21 may include a tag chip of ST25DV series, the tag chip may include an I2C (Inter-Integrated Circuit) interface; and is connected to the control circuit 50 through this interface, that is, communication between the control circuit 50 and the energy conversion sub-circuit 21 may be implemented through the I2C bus.

Thus, when the refreshing is completed, the charging circuit is electrically disconnected in time to reduce the self-discharge of the energy storage circuit, reduce the next charging period and improve the user experience.

Figure 3:
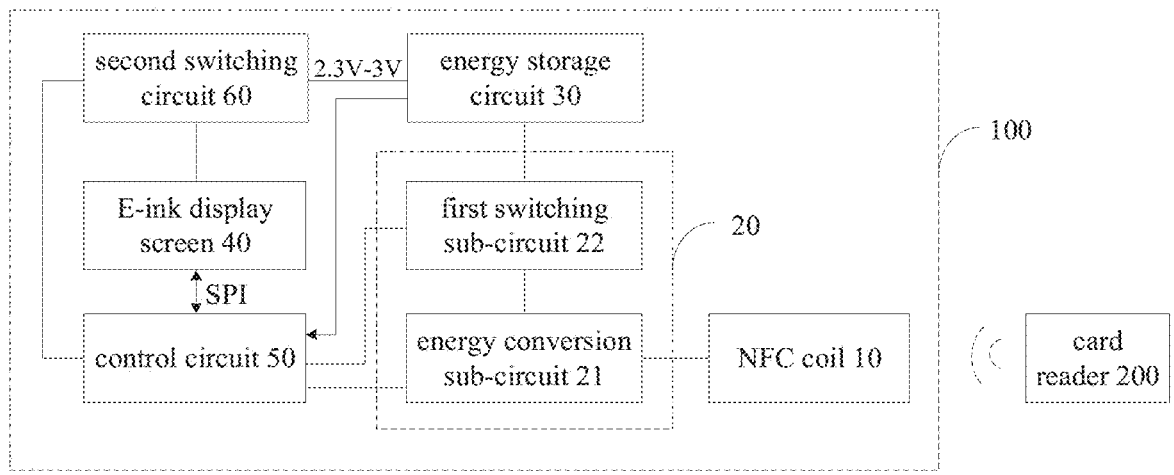
FIG. 3 is a structural block diagram of a NFC tag according to another embodiment of the present disclosure.

In an embodiment of the present disclosure, as shown in FIG. 3, the NFC tag 100 may further include a second switching circuit 60. The second switching circuit 60 is connected to the energy storage circuit 30 and the electronic ink display screen 40, respectively, and the second switching circuit 60 is configured to electrically connect the energy storage circuit 30 to the electronic ink display screen 40 or electrically disconnect the energy storage circuit 30 from the electronic ink display screen 40.

Further, referring to FIG. 3, the control circuit 50 is connected to the second switching circuit 60, and the control circuit 50 is further configured to: control the second switching circuit 60 to electrically connect the energy storage circuit 30 to the electronic ink display screen 40 after the data transmission has been performed.

Specifically, after the data transmission has been performed, the control circuit 50 may detect whether the voltage of the energy storage circuit 30 reaches a rated voltage (e.g. 2.3 V) of the electronic ink display screen 40, control the second switching circuit 60 to be turned on when the rated voltage (e.g. 2.3 V) of the electronic ink display screen 40 is reached, so that the energy storage circuit 30 powers the electronic ink display screen 40, and at the same time, the control circuit 50 controls the electronic ink display screen 40 to refresh the display content, so that the electronic ink display screen 40 displays the transmitted data.

In this example, the first switching sub-circuit 22 and/or the second switching circuit 60 may be a Metal Oxide Semiconductor Field Effect Transistor (MOSFET). Referring to FIG. 3, the energy storage circuit 23 may output a voltage between 2.3 V and 3 V to the electronic ink display screen 40 to power the electronic ink display screen 40.

Figure 4:
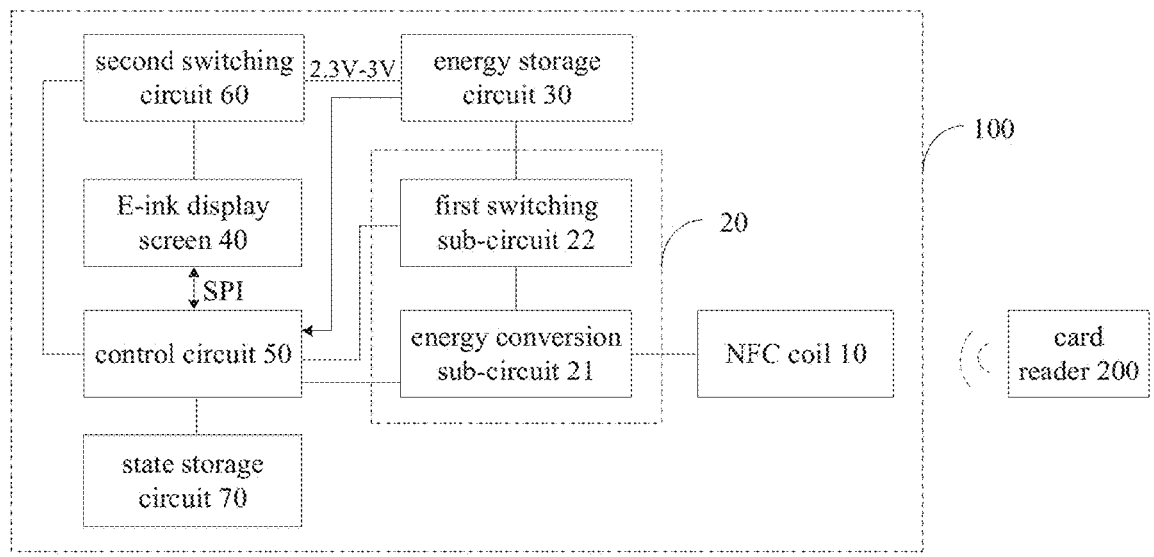
FIG. 4 is a structural block diagram of a NFC tag according to yet another embodiment of the present disclosure.

In an embodiment of the present disclosure, as shown in FIG. 4, the NFC tag 100 may further include a state storage circuit 70. The control circuit 50 may further be configured to: when the card reader 200 is within the set range near the NFC coil 10 and the control module 50 starts to operate, identify the card reader 200 via the energy conversion sub-circuit 21, determine whether the NFC tag 100 is matched with the card reader 200, update a flag bit state in the state storage circuit 70 to a charging waiting state when the NFC tag is successfully matched with the card reader, update the flag bit state in the state storage circuit 70 to a charging completion state when detecting that the voltage of the energy storage circuit 30 reaches the rated voltage, and update the flag bit state in the state storage circuit 70 to a refreshing success state after refreshing the display content of the electronic ink display screen 40.

Specifically, referring to FIG. 4, the control circuit 50 may be connected to the state storage circuit 70 to update the flag bit state in the state storage circuit 70, wherein the flag bit state may indicate a current operating state of the NFC tag 100. The state storage circuit 70 may not only support fast transmission (e.g. 26.5 Kbps) mode data transmission, but may also have a storage space of 8 Kbit Electrically Erasable Programmable Read Only Memory (EEPROM). The card reader 200 and the NFC tag 100 may agree to update the current state at a designated storage address of the storage space, and the storage space may be encrypted and protected by a password of 64 bits; only the control circuit 50 of the NFC tag 100 and the corresponding card reader 200 may access the encrypted storage space.

Specifically, when the card reader 200 is within the set range near the NFC coil 10 and the control circuit 50 starts to operate, the card reader 200 is identified and matched by the energy conversion sub-circuit 21 so as to identify and verify whether the energy conversion sub-circuit 21 is accurately matched to the corresponding card reader 200, and a verification result is transmitted to the control circuit 50; if the card reader 200 is matched, it indicates that the matching is successful; the control circuit 50 updates the flag bit state in the state storage circuit 70 to the state for waiting to be charged when the NFC tag is matched with the card reader, updates the flag bit state in the state storage circuit 70 to the charging completion state when detecting that the voltage of the energy storage circuit 30 reaches the rated voltage; at this time, the card reader 200 may prompt a user to perform data transmission, and after the data transmission has been performed and the display content of the electronic ink display screen 40 is refreshed, the control circuit 50 updates the flag bit state in the state storage circuit 70 to the refreshing success state; at the same time, a display interface of the card reader 200 may display that the refreshing is successful to prompt the user that the NFC tag 100 is successfully refreshed. When the output voltage of the energy conversion sub-circuit 21 is greater than 1.8 V, the control circuit 50 starts to operate.

Thus, the NFC tag 100, in combination with the NFC-specific security encryption mechanism, perform encryption protection on the state updating process, prevent the state from being lost or erroneously changed, and increase the stability during refreshing.

Figure 5:
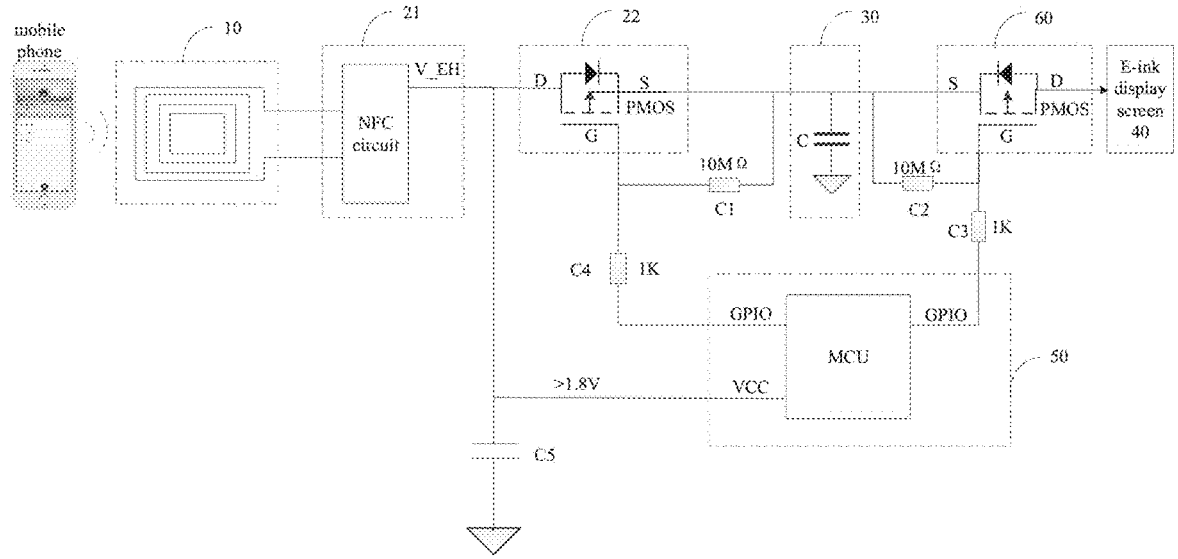
FIG. 5 is a schematic structural diagram of a NFC tag according to a specific embodiment of the present disclosure.

In a specific embodiment of the present disclosure, as shown in FIG. 5, each of the first switching sub-circuit 22 and the second switching circuit 60 is a P-channel MOS transistors (including a source electrode S, a gate electrode G and a drain electrode D), the energy storage circuit 30 may be a supercapacitor C, the control circuit 50 may be a Single Chip Microcomputer (MCU) such as a single chip computer of STM8L series, and the card reader 200 may be a mobile phone having a NFC function.

In practical applications, when a mobile phone is close to the NFC tag 100 and is located within the set range near the NFC coil 10, the NFC coil 10 acquires a magnetic field signal and transmits the magnetic field signal to the energy conversion sub-circuit 21, so that the energy conversion sub-circuit 21 converts the magnetic field signal into an electrical signal, and outputs a voltage V_EH to the MCU. When the MCU detects that the voltage V_EH is greater than 1.8 V, the MCU starts to operate, at this moment, the MCU identifies and matches the mobile phone via the energy conversion sub-circuit 21, pulls up a General Purpose Input Output (GPIO) port on the left side of the MCU controlled by the first switching sub-circuit 22 when the matching is successful; and then the MCU controls the first switching sub-circuit 22 to be turned on so as to turn on the charging circuit, so that the energy conversion sub-circuit 21 charges the supercapacitor C via the first switching sub-circuit 22. In the charging process, the MCU starts to perform data transmission with the mobile phone when the MCU detects that the voltage of the supercapacitor C reaches the rated voltage of 1.8 V, and after the data transmission has been performed, the MCU controls the second switching circuit 60 to be turned on, and starts to refresh the display content of the electronic ink display screen 40; when the refreshing is completed, the MCU may control the first switching sub-circuit 22 to electrically disconnect the supercapacitor C from the energy conversion sub-circuit 21, namely, automatically disconnecting the charging circuit, so that the supercapacitor C is in a high-resistance loop, which may effectively reduce the self-discharge speed and greatly improve the user experience.

In this example, referring to FIG. 5, the NFC tag 100 may further include a first capacitor C1, a second capacitor C2, a third capacitor C3, a fourth capacitor C4 and a fifth capacitor C5, wherein capacitance values of the first capacitor C1 and the second capacitor C2 may be 10 MΩ so as to protect the P-channel MOS transistor; and capacitance values of the third capacitor C3 and the fourth capacitor C4 may be 1 K so as to increase the speed of turning on the P-channel MOS transistor.

It should be noted that, in this example, the calculation may be made by the following equation: $Q=Cv \times \Delta V=I \times t$, where Q represents the electric quantity required for refreshing the display content of the electronic ink display screen 40; Cv represents a capacitance value of the supercapacitor C, which may be, for example, 0.07 F; $\Delta V$ represents a voltage difference, which may be, for example, 1.6 V; I represents a charging current; and t represents a charging period. Furthermore, the electric quantity Q required for refreshing the display content of the electronic ink display screen 40 may be calculated according to the operating current and operating period required for the refreshing, so that when the voltage difference $\Delta V$ and the charging current I are known, the capacitance value Cv of the supercapacitor C and the charging period t may be calculated. Thus, charging is performed according to the calculated capacitance value of the supercapacitor and the charging period to improve the charging speed and ensure the efficiency and accuracy of charging.

In this example, in the process of data transmission between the NFC tag 100 and the mobile phone 200, if the transmission is suddenly interrupted, the charging is interrupted, and in this case, it may be ensured that the charging circuit is automatically turned off, thereby reducing the discharge amount of the supercapacitor C, so that if the next charging is performed, the supercapacitor C will continue to be charged on the basis of the electric quantity when the interruption occurs, that is, the electric quantity of the supercapacitor C will not self-discharge to 0 V due to the sudden interruption of the charging, thereby greatly saving the charging period for the second charging.

That is, the present disclosure provides an automatically switchable power management circuit that automatically turns on the charging circuit to start wireless charging when the card reader 200 or another mobile terminal providing charging services approaches the NFC tag 100. When the charging is interrupted, the charging circuit is automatically turned off, thereby reducing the self-discharge of the supercapacitor, effectively ensuring the electric quantity acquired by the supercapacitor, and saving the time period of the next charging.

Figure 6:
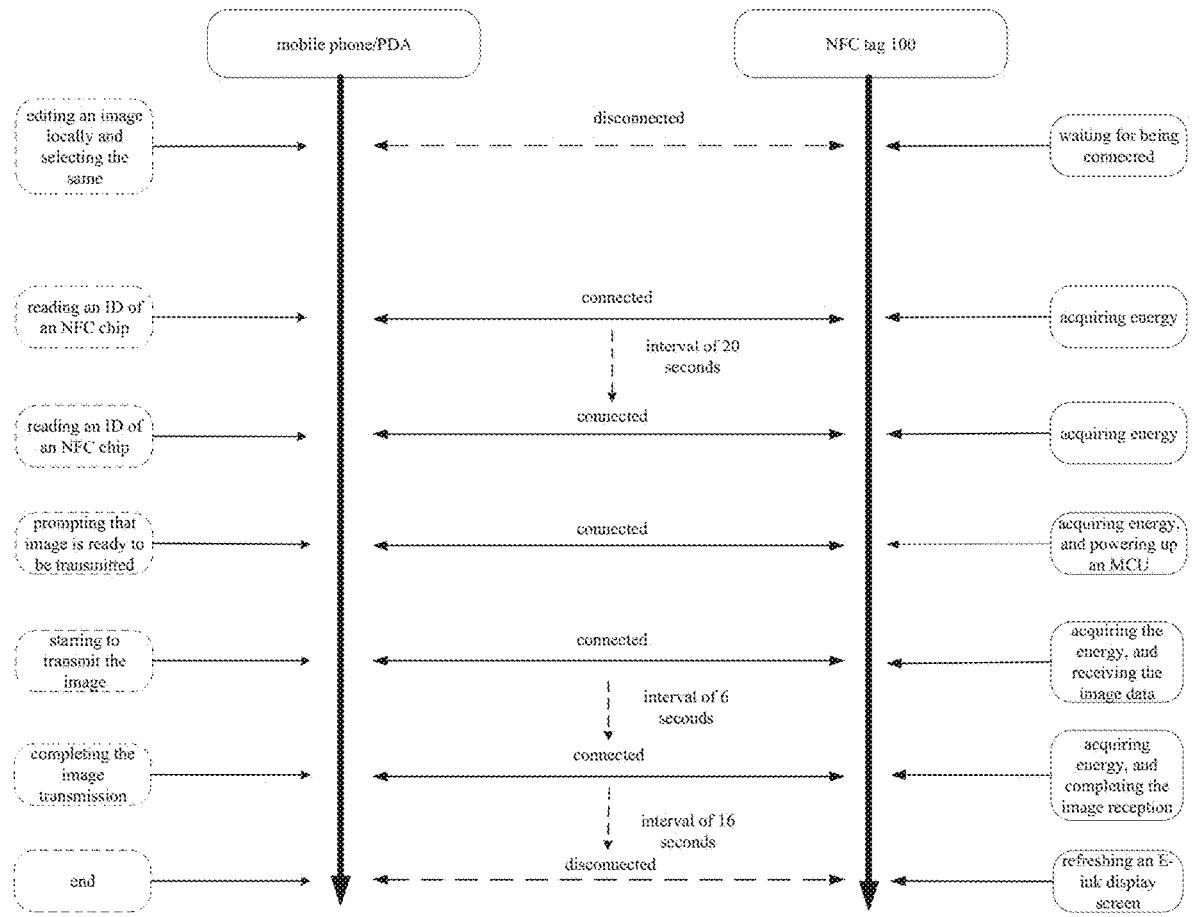
FIG. 6 is a schematic flowchart diagram of image data transmission between a mobile phone and a NFC tag according to a specific embodiment of the present disclosure.

In this example, as shown in FIG. 6, when image data transmission between the mobile phone and the NFC tag 100 is performed, at the side of the mobile phone, a user may edit a local image and select the same, and when the mobile phone is close to the NFC tag 100, the NFC tag 100 may read an ID value of an NFC chip in the mobile phone every 20 seconds to perform verification and establish a connection when the verification passes, and then the mobile phone prompts that the image is ready to be transmitted. Accordingly, the NFC tag 100 continues to perform energy acquisition (wireless charging), and controls to power up the MCU; when the image at the mobile phone starts to be transmitted, accordingly, the NFC tag 100 continues to perform energy acquisition, receives image data; and detect whether the transmission is completed every 6 seconds in the image transmission process. When the transmission is completed, the NFC tag 100 refreshes the display content of the Electronic ink (E-ink) display screen 40 so as to display the image received from the mobile phone, detects whether the refreshing is completed every 16 seconds in the refreshing process, and displays the image on the electronic ink display screen 40 when the refreshing is completed. Thus, the entire communication flow ends.

That is, six states of "tag identification"→"connected-"→"wireless charging"→"image data transmission"→"E-ink refreshing"→"disconnected" may be realized in sequence by the two sides of the mobile phone and the NFC tag through a negotiation of the states. Thus, the automatic management of charging and data transmission states is realized, and the adverse effects caused by many uncertain states (for example, the card reader being not in the field, a tag being not identified) in the NFC process are suppressed.

It should be noted that the embodiments of the present disclosure do not use a battery, and thus the power supply voltage of the NFC tag 100 may be updated in real time to determine the next step to be performed, which increases the success rate of tag refreshing.

Therefore, in the NFC tag according to the embodiments of the present disclosure, the energy storage circuit is charged under the action of a magnetic field signal to realize wireless charging, which does not require the battery power supply, and is more energy-saving and environmentally-friendly, has the advantages of low cost and low power consumption, and satisfies the user's battery free requirement. The technologies of wireless charging, NFC, energy acquisition, energy storage and ink refreshing are combined, and reasonable utilization of electric quantity are realized through intensive electric quantity management, so that the NFC tag is more energy-saving and environmental-friendly. The charging circuit is controlled to be automatically turned on and automatically turned off, so that next longer charging period due to self-discharge is avoided, and the next charging period is saved. Moreover, it implements high degree of automation, and greatly improves the user experience.

Figure 7:
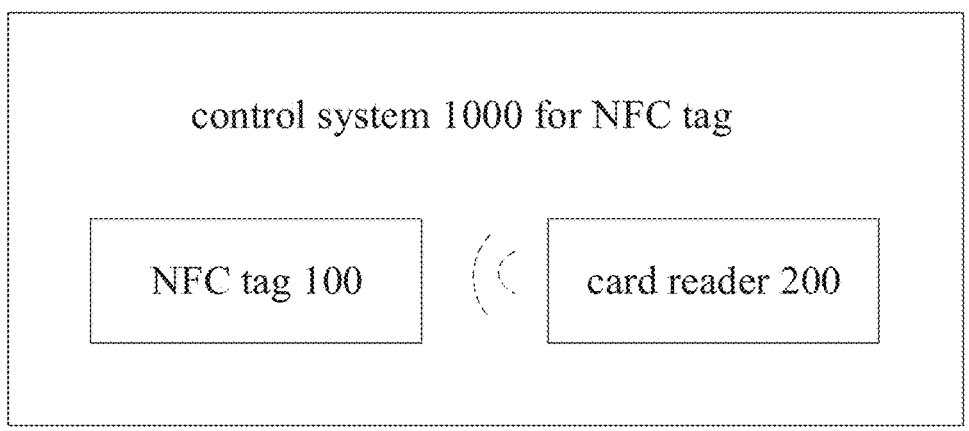
FIG. 7 is a structural block diagram of a control system of a NFC tag according to an embodiment of the present disclosure.

FIG. 7 is a structural block diagram of a control system for a NFC tag according to an embodiment of the present disclosure.

As shown in FIG. 7, the system 1000 includes a card reader 200 and the NFC tag 100 according to the above embodiments of the present disclosure. The card reader 200 may be a mobile terminal having a NFC function.

The control system for the NFC tag uses the NFC tag according to the embodiments of the present disclosure, an energy storage circuit thereof is charged under the action of a magnetic field signal to realize wireless charging, which does not require the battery power supply, so that the system is more energy-saving and environmentally friendly, and has advantages of low cost and low power consumption.

In the description of the present disclosure, it should be understood that the orientation or positional relationship indicated by the terms "center", "longitudinal", "transverse", "length", "width", "thickness", "upper", "lower", "front", "rear", "left", "right", "vertical", "horizontal", "top", "bottom", "inner", "outer", "clockwise", "anticlockwise", "axial", "radial", "circumferential", and the like is based on the orientation or positional relationship shown in the drawings, and is merely for convenience of describing the present disclosure and simplifying the description, but not indicate or imply that the referred device or element must have a particular orientation, be constructed and operated in a particular orientation, and thus should not be construed as limiting the present disclosure.

In addition, the terms "first" and "second" are used for descriptive purposes only and are not to be construed as indicating or implying relative importance or implicitly indicating the number of technical features indicated. Thus, a feature defined with "first", "second" may explicitly or implicitly include one or more of such features. In the description of the present disclosure, the meaning of "a plurality" is at least two, for example, two, three, etc. unless and specifically limited otherwise.

In the description of the present disclosure, it should be noted that the terms "mount", "connect", "connected", "fix", and the like are to be construed broadly, for example, may be fixedly connected, removably connected, or integrally connected, may be a mechanical connection or an electric connection, may be a direct connection or an indirect connection through an intermediate medium, may be a communication or an interaction between two elements, unless explicitly stated or defined. The specific meanings of the above terms in the present disclosure will be understood on a case-by-case basis by those of ordinary skill in the art.

In the present disclosure, a first feature is "above" or "below" a second feature, which means that the first and second features are in direct contact, or the first and second features are in indirect contact through an intermediary. Further, the first feature is "on", "above" and "over" the second feature, which may be that the first feature is directly above or obliquely above the second feature, or merely indicate that the first feature is at a higher level than the second feature. The first feature is "under", "below" and "beneath" the second feature, which may be that the first feature is directly below or obliquely below the second feature, or merely indicate that the first feature is at a lower level than the second feature.

In the description of the present specification, the reference terms "an embodiment", "some embodiments", "examples", "specific examples", "some examples", and like mean that a particular feature, structure, material or characteristic described in connection with the embodiment or example is included in at least one embodiment or example of the present disclosure. In the present specification, schematic representations of the above terms are not necessarily directed to the same embodiment or example. Furthermore, the particular features, structures, materials, or characteristics described may be combined in any suitable manner in any one or more embodiments or examples. Furthermore, those skilled in the art can integrate and combine different embodiments or examples as well as features of different embodiments or examples described in the present specification without contradicting each other.

While the embodiments of the present disclosure are illustrated and described above, it should be understood that the above embodiments are illustrative and not restrictive to the present disclosure, and those skilled in the art can make changes, modifications, substitutions, and variations to the embodiments within the scope of the present disclosure.

What is claimed is:

1. A Near Field Communication (NFC) tag, comprising: a NFC coil, a control circuit, an energy acquisition circuit, an energy storage circuit, and an electronic ink display screen wherein the NFC coil is configured to detect a magnetic field signal transmitted by a card reader when a distance between the NFC tag and the card reader is within a predetermined distance range;

the energy acquisition circuit is configured to convert the magnetic field signal into an electrical signal when the NFC coil detects the magnetic field signal; and the control circuit is configured to control the energy acquisition circuit to transmit the electrical signal to the energy storage circuit, and control to charge the energy storage circuit through the electrical signal;

the electronic ink display screen is connected to the control circuit, the control circuit is configured to control the NFC tag to perform data transmission with the card reader upon detecting that a voltage of the energy storage circuit has reached a rated voltage, and refresh display content of the electronic ink display screen after the data transmission has been performed.

2. The NFC tag according to claim 1, wherein the energy acquisition circuit is connected to the NFC coil and the control circuit, respectively, and the energy storage circuit is connected to the energy acquisition circuit and the control circuit, respectively.

3. The NFC tag according to claim 2, wherein the energy acquisition circuit comprises:

an energy conversion sub-circuit, wherein the energy conversion sub-circuit is connected to the NFC coil and the control circuit, respectively, the energy conversion sub-circuit is configured to convert the magnetic field signal into the electrical signal when the NFC coil detects the magnetic field signal, and the control circuit is configured to control the energy conversion sub-circuit to transmit the electrical signal to the energy storage circuit; and a first switching sub-circuit, wherein the first switching sub-circuit is connected to the energy conversion sub-circuit and the energy storage circuit, respectively, and the first switching sub-circuit is configured to electrically connect the energy conversion sub-circuit to the energy storage circuit, or electrically disconnect the energy conversion sub-circuit from the energy storage circuit.

4. The NFC tag according to claim 3, wherein the control circuit is connected to the first switching sub-circuit, and the control circuit is further configured to:

control the first switching sub-circuit to electrically disconnect the energy conversion sub-circuit from the energy storage circuit after the display content of the electronic ink display screen has been refreshed.

5. The NFC tag according to claim 3, further comprising:

a second switching circuit, wherein the second switching circuit is connected to the energy storage circuit and the electronic ink display screen, respectively, and the second switching circuit is configured to electrically connect the energy storage circuit to the electronic ink display screen or electrically disconnect the energy storage circuit from the electronic ink display screen.

6. The NFC tag according to claim 5, wherein the control circuit is connected to the second switching circuit, and the control circuit is further configured to:

control the second switching circuit to electrically connect the electronic ink display screen to the energy storage circuit after the data transmission has been performed.

7. The NFC tag according to claim 3, further comprising:

a state storage circuit;

the control circuit is further configured to: identify the card reader through the energy conversion sub-circuit when the distance between the NFC tag and the card reader is within the predetermined distance range, determine whether the NFC tag is matched with the card reader, update a flag bit state in the state storage circuit to be a state of waiting for being charged when the NFC tag is matched with the card reader; update the flag bit state in the state storage circuit to be a charging completion state upon detecting that the voltage of the energy storage circuit has reached the rated voltage; and update the flag bit state in the state storage circuit to be a refreshing success state after the display content of the electronic ink display has been refreshed.

8. The NFC tag according to claim 1, wherein the energy storage circuit is a supercapacitor.

9. The NFC tag according to claim 5, wherein the first switching sub-circuit and/or the second switching circuit is a metal oxide semiconductor field effect transistor.

10. The NFC tag according to claim 7, wherein the state storage circuit is an Electrically Erasable Programmable Read Only Memory (EEPROM).

11. A control system for a NFC tag, comprising: a card reader and the NFC tag according to claim 1.

12. The control system according to claim 11, wherein the card reader is a mobile terminal having a NFC function.

13. The control system according to claim 11, wherein the energy acquisition circuit is connected to the NFC coil and the control circuit, respectively, and the energy storage circuit is connected to the energy acquisition circuit and the control circuit, respectively.

14. The control system according to claim 13, wherein the energy acquisition circuit comprises:

an energy conversion sub-circuit, wherein the energy conversion sub-circuit is connected to the NFC coil and the control circuit, respectively, the energy conversion sub-circuit is configured to convert the magnetic field signal into the electrical signal when the NFC coil detects the magnetic field signal, and the control circuit is configured to control the energy conversion sub-circuit to transmit the electrical signal to the energy storage circuit; and a first switching sub-circuit, wherein the first switching sub-circuit is connected to the energy conversion sub-circuit and the energy storage circuit, respectively, and the first switching sub-circuit is configured to electrically connect the energy conversion sub-circuit to the energy storage circuit, or electrically disconnect the energy conversion sub-circuit from the energy storage circuit.

15. The control system according to claim 14, wherein the control circuit is connected to the first switching sub-circuit, and the control circuit is further configured to:

control the first switching sub-circuit to electrically disconnect the energy conversion sub-circuit from the energy storage circuit after the display content of the electronic ink display screen has been refreshed.

16. The control system according to claim 14, wherein the NFC tag further comprises:

a second switching circuit, wherein the second switching circuit is connected to the energy storage circuit and the electronic ink display screen, respectively, and the second switching circuit is configured to electrically connect the energy storage circuit to the electronic ink display screen or electrically disconnect the energy storage circuit from the electronic ink display screen.

17. The control system according to claim 16, wherein the control circuit is connected to the second switching circuit, and the control circuit is further configured to:

control the second switching circuit to electrically connect the electronic ink display screen to the energy storage circuit after the data transmission has been performed.

18. The control system according to claim 14, wherein the NFC tag further comprises:
- a state storage circuit;
- the control circuit is further configured to: identify the card reader through the energy conversion sub-circuit when the distance between the NFC tag and the card reader is within the predetermined distance range, determine whether the NFC tag is matched with the card reader, update a flag bit state in the state storage circuit to be a state of waiting for being charged when the NFC tag is matched with the card reader; update the flag bit state in the state storage circuit to be a charging completion state upon detecting that the voltage of the energy storage circuit has reached the rated voltage; and update the flag bit state in the state storage circuit to be a refreshing success state after the display content of the electronic ink display has been refreshed.

* * * * *